US008988056B2

(12) United States Patent
Smith, Jr. et al.

(10) Patent No.: US 8,988,056 B2
(45) Date of Patent: Mar. 24, 2015

(54) CONVERTER WITH HYSTERETIC CONTROL

(71) Applicant: Microsemi Corporation, Aliso Viejo, CA (US)

(72) Inventors: Kevin Mark Smith, Jr., Dana Point, CA (US); Ekrem Cengelci, Garden Grove, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 161 days.

(21) Appl. No.: 13/659,046

(22) Filed: Oct. 24, 2012

(65) Prior Publication Data

US 2013/0106385 A1 May 2, 2013

Related U.S. Application Data

(60) Provisional application No. 61/551,532, filed on Oct. 26, 2011.

(51) Int. Cl.
*G05F 1/595* (2006.01)
*H02M 3/158* (2006.01)
*H02M 1/00* (2006.01)

(52) U.S. Cl.
CPC .... *H02M 3/1588* (2013.01); *H02M 2001/0016* (2013.01); *H02M 2001/0025* (2013.01); *Y02B 70/1466* (2013.01)
USPC ........... 323/285; 323/288; 323/284; 323/283; 323/282

(58) Field of Classification Search
CPC ... H02M 3/156; H02M 3/158; H02M 3/1588; H02M 3/33507; H02M 2001/0032; H02M 2001/0025
USPC ......................................... 323/288, 282–285
See application file for complete search history.

(56) References Cited

U.S. PATENT DOCUMENTS 5,955,910 A * 9/1999 Levin et al. .................... 327/393
6,791,306 B2 9/2004 Walters et al.
(Continued)

OTHER PUBLICATIONS

N. Keskar, G.A. Rincon-Mora; "Self-Stabilizing, Integrated, Hysteretic Boost DC-DC Converter"; Nov. 2-6, 2004; pp. 586-591; The 30th Annual Conference of the IEEE Industrial Electronics Society, Nov. 2-6, 2004; IEEE, New York, NY.

(Continued)

*Primary Examiner* — Matthew Nguyen
*Assistant Examiner* — Kevin H Sprenger
(74) *Attorney, Agent, or Firm* — Simon Kahn (57) ABSTRACT

A hysteretic power converter constituted of: a switched mode power supply; a hysteretic comparator, a first input of the comparator arranged to receive a feedback signal providing a representation of the output voltage of the switched mode power supply and a second input of the comparator arranged to receive a reference voltage; a ramp capacitor coupled to one of the first and second input of the comparator; a current source, a terminal of the current source coupled to the ramp capacitor and arranged to drive current to the ramp capacitor; and a switchable current source, a terminal of the switchable current source coupled to the ramp capacitor, the switchable current source arranged to drive current to the ramp capacitor in a direction opposite the current driven by the current source, wherein the switchable current source is alternately enabled and disabled responsive to the output of the hysteretic comparator.

24 Claims, 8 Drawing Sheets

(56) References Cited

U.S. PATENT DOCUMENTS

| | | | |
|---|---|---|---|
| 6,801,026 B2 | 10/2004 | Schrom et al. | |
| 7,000,125 B2 | 2/2006 | Chapuis et al. | |
| 7,019,502 B2 | 3/2006 | Walters et al. | |
| 7,132,820 B2 | 11/2006 | Walters et al. | |
| 7,457,140 B2 | 11/2008 | Klein | |
| 7,495,419 B1* | 2/2009 | Ju | 323/259 |
| 2008/0042633 A1 | 2/2008 | Klein | |
| 2008/0174286 A1* | 7/2008 | Chu et al. | 323/271 |
| 2009/0009148 A1* | 1/2009 | Philbrick | 323/282 |
| 2010/0123446 A1 | 5/2010 | Cheng et al. | |

OTHER PUBLICATIONS

L. Malesani et al; "Digital, Adaptive Hysteresis Current Control with Clocked Commutations and Wide Operating Range"; 1996; IEEE Transactions on Industry Applications; pp. 316-325; vol. 32, Issue 2; IEEE, New York, NY.

Pengfei, Li et al; "A 90-240 MHz Hysteretic Controlled DC-DC Buck Converter with Digital Phase Locked Loop Synchronization"; Aug. 24, 2011; IEEE Journal of Solid State Circuits, vol. 46, No. 9, pp. 2108-2119; IEEE, New York, NY.

Pengfei, Li; Synchronization and Control of High Frequency DC-DC Converters; 2009; Dissertation for PhD, University of Florida, Gainesville, FL.

Taniguchi, Kiichiro et al; "Constant Frequency Hysteretic PWM Controlled Buck Converter"; 2009; International Conference on Power Electronics and Drive Systems, PEDS 2009, pp. 1194-1199; IEEE, New York, NY.

International Search Report for parallel PCT/US2012/061559 mailed Jun. 14, 2013 by European Patent Office.

Written Opinion of the International Searching Authority for parallel PCT/US2012/061559 mailed Jun. 14, 2013 by European Patent Office.

International Search Report for parallel PCT/US2012/061559 mailed Nov. 28, 2013 by European Patent Office.

Written Opinion of the International Searching Authority for parallel PCT/US2012/061559 mailed Nov. 28, 2013 by European Patent Office.

* cited by examiner

CONVERTER WITH HYSTERETIC CONTROL

CROSS-REFERENCE TO RELATED APPLICATION

This application claims priority from U.S. Provisional Patent Application Ser. No. 61/551,532 filed Oct. 26, 2011, entitled Converter With Hysteretic Control, the entire contents of which is incorporated herein by reference.

BACKGROUND OF THE INVENTION

The present invention relates to the field of power converters, and in particular to a hysteretic converter wherein a feedback voltage is compared with a controlled ramp voltage added to a reference voltage.

Various schemes of controlling a DC to DC power converter are known. In a linear controlled power converter, one of the output voltage and output current are sensed and fedback to the controller via an error amplifier. A reference value, reflective of a target output, is further received by the error amplifier, and differences in output from the target output are detected and compensated for, typically by adjusting the amount of time that an electronically controlled switch is closed. In such an embodiment, the output voltage or current varies about the target output, and the average output over time may equal the target output. Such a linear regulation control however is inappropriate when a quick reaction to large changes in load is required.

In order to overcome this difficulty, a hysteretic converter is utilized. The hysteretic converter comprises at least one electronically controlled switch, a comparator and an inductor, the electronically controlled switch being closed responsive to the output of the comparator. The comparator is arranged to close the electronically controlled switch promptly responsive to the instantaneous output voltage falling below a first reference signal, thus driving the output voltage higher without the delay of an integrator or other low bandwidth circuitry. Various schemes for opening the electronically controlled switch exist, including, but not limited to, comparing the output voltage to a second reference and defining a predetermined fixed on time for the electronically controlled switch.

Figure 1:
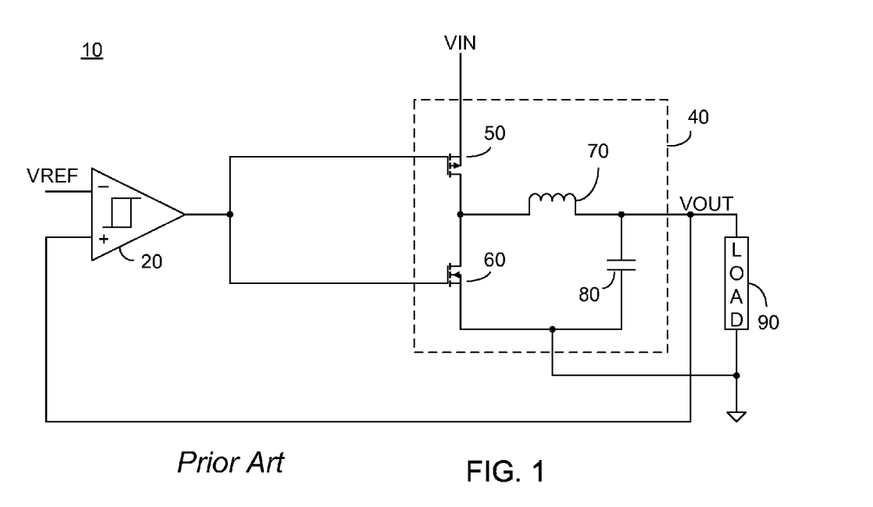
FIG. 1 illustrates a high level schematic diagram of a hysteretic converter according to the prior art.

FIG. 1 illustrates a high level schematic diagram of a hysteretic converter 10 of the prior art comprising: a hysteretic comparator 20 illustrated as a Schmidt trigger comparator; a switched mode power supply 40, illustrated without limitation as a buck converter constituted of a first electronically controlled switch 50 illustrated without limitation as a p-channel field-effect transistor (PFET), a second electronically controlled switch 60 illustrated without limitation as an n-channel field-effect transistor (NFET), an inductor 70 and an output capacitor 80. Additionally, a load 90 is further illustrated. An input voltage VIN is connected to the source of PFET 50, and the drain of PFET 50 is connected to a first end of inductor 70 and to the drain of NFET 60. A second end of inductor 70 is connected to a first end of output capacitor 80 and to a first end of load 90, the voltage thereat denoted output voltage VOUT. A second end of load 90, a second end of output capacitor 80 and the source of NFET 60 are connected to a common potential.

Output voltage VOUT is further connected to the noninverting input of hysteretic comparator 20 and a reference voltage VREF is connected to the inverting input of hysteretic comparator 20. The output of hysteretic comparator 20 is connected to both the gate of PFET 50 and to the gate of NFET 60. Optionally, (not shown) a gate driving circuit is provided between the output of hysteretic comparator 20 and the gates of PFET 50 and NFET 60. Output voltage VOUT is illustrated as being fed directly to the non-inverting input of hysteretic comparator 20, however this is not meant to be limiting in any way, and a function of output voltage VOUT, such as a voltage divided output consonant with reference voltage VREF, may alternately be fed back to the non-inverting input of hysteretic comparator 20, preferably any function being without active devices which result in a reduced bandwidth for response to changes in load 100.

In operation, when output voltage VOUT falls to less than the threshold value signal fed to the inverting input of hysteretic comparator 20, i.e. reference voltage VREF, hysteretic comparator 20 enables current flow through PFET 50, thus connecting inductor 70 to input voltage VIN and enabling increased current flow through inductor 70, defined as positive when flowing in the direction of output capacitor 80, thus increasing output voltage VOUT. When output voltage VOUT is greater than reference voltage VREF, hysteretic comparator 20 enables current flow through NFET 60, thus connecting inductor 70 to the common potential enabling current to freewheel through NFET 60; current flow through inductor 70 decreases over time thus decreasing output voltage VOUT. Hysteresis is provided by hysteretic comparator 20 to avoid instability.

Unfortunately, hysteretic converters typically exhibit unstable behavior in a circuit where the output capacitor exhibits a low equivalent series resistance, since the output voltage does not rise promptly responsive to the closing of the electronically controlled switch. Various resolutions to the above drawback have been proposed, primarily by artificially inducing a ripple which is in phase with the inductor current.

In one solution, as described in U.S. Pat. No. 6,791,306 issued Sep. 14, 2004 to Walters et al, the entire contents of which is incorporated herein by reference, a transconductance amplifier is provided connected across the inductor. The current generated by the transconductance amplifier is fed to a ripple voltage capacitor which transforms the current into an inductor current-representative voltage for input to the hysteretic comparator. Such a solution requires an input from both sides of the inductor, which may be difficult to accomplish.

In another solution, as described in U.S. Pat. No. 7,457,140 issued Nov. 25, 2008 to Klein, the entire contents of which is incorporated herein by reference, a ramp voltage, which is proportional to current flowing through the inductor, is generated and added to an output voltage representation, the summed voltage fed as an input to the hysteretic comparator. The embodiments shown are complex, requiring either the aforementioned input from both sides of the inductor, and/or dual edge one shot circuits.

SUMMARY OF THE INVENTION

Accordingly, it is a principal object of the present invention to overcome at least some of the disadvantages of the prior art. This is provided in certain embodiments by a hysteretic converter comprising a half bridge circuit arranged to alternately feed power to an inductor and withdraw power from the inductor. A ramp voltage is generated by the combination of a first current source, which is enabled when the top switch of the bridge is enabled, and disabled when the top switch of the bridge is disabled, and a second current source arranged in an opposing direction, each of the first and second current sources connected to one end of a capacitor and an optional resistor in parallel with the capacitor. The ramp voltage is added to a reference voltage and provided to one input of the hysteretic comparator. Preferably, an auto-zero circuit is provided across the capacitor and the, thus ensuring that the output voltage is determined responsive to a feedback input coupled to the other input of the hysteretic comparator.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The terms "connected" or "coupled", or any variant thereof, as used herein is not meant to be limited to a direct connection, and is meant to include any coupling or connection, either direct or indirect, and the use of appropriate resistors, capacitors, inductors and other active and non-active elements does not exceed the scope thereof.

Figure 2A:
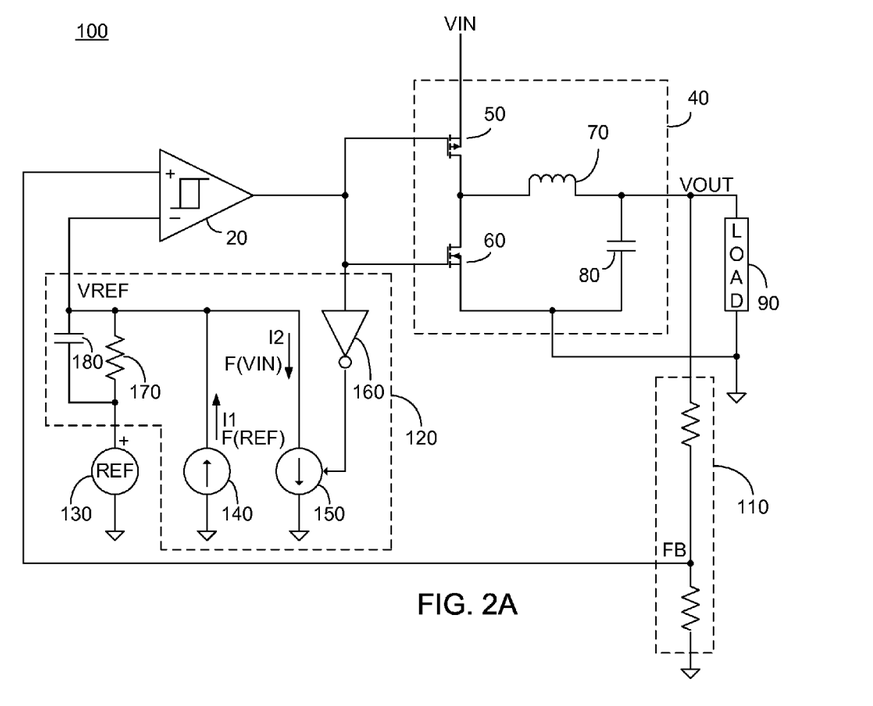
FIG. 2A illustrates a high level schematic diagram of an exemplary embodiment of a hysteretic converter comprising a pair of current sources and a ramp capacitor, one of the current sources arranged to be enabled when the top switch of a half bridge driving circuit is enabled thereby forming a ramp voltage across the ramp capacitor, the ramp voltage added to a reference voltage.

FIG. 2A illustrates a high level schematic diagram of an exemplary embodiment of a hysteretic converter 100 comprising: a hysteretic comparator 20, comprising in one non-limiting embodiment a Schmidt trigger comparator; a switched mode power supply 40, illustrated without limitation as a buck converter; a voltage divider 110; a ramp generator 120; and a reference voltage source 130. Additionally, a load 90 is further illustrated. Switched mode power supply 40 comprises: a first electronically controlled switch 50, comprising in one non-limiting embodiment a PFET; a second electronically controlled switch 60, comprising in one non-limiting embodiment an NFET; an inductor 70; and an output capacitor 80. Ramp generator 120 comprises: a current source 140; a switchable current source 150; an inverter 160; a ramp resistor 170; and a ramp capacitor 180. First electronically controlled switch 50 is also known as the high side switch, whereas second electronically controlled switch 60 is also known as the low side switch.

An input voltage VIN is connected to the source of PFET 50, and the drain of PFET 50 is connected to a first end of inductor 70 and to the drain of NFET 60. A second end of inductor 70 is connected to a first end of output capacitor 80, to a first end of load 90 and to a first end of voltage divider 110, the voltage thereat denoted output voltage VOUT. A second end of load 90, a second end of output capacitor 80 and the source of NFET 60 are connected to a common potential.

A second end of voltage divider 110 is connected to the common potential. The common node of voltage divider 110 is connected to the non-inverting input of hysteretic comparator 20 and constitutes a feedback connection, the voltage thereat constituting a feedback signal and denoted FB. The output of hysteretic comparator 20 is connected to the gate of PFET 50, to the gate of NFET 60 and to the input of inverter 160. The output of inverter 160 is connected to the control input of switchable current source 150. The input of switchable current source 150 is connected to the output of current source 140, a first end of ramp resistor 170, a first end of ramp capacitor 180 and the inverting input of hysteretic comparator 20, the voltage thereat denoted VREF. A second end of ramp resistor 170 is connected to a second end of ramp capacitor 180 and the positive end of reference voltage source 130. The negative end of reference voltage source 130, the input of current source 140 and the output of switchable current source 150 are connected to the common potential. Optionally, (not shown) a gate driving circuit is provided between the output of comparator 20 and the gates of PFET 50 and NFET 60. Ramp capacitor 180 is preferably not coupled to ground.

Preferably the amplitude of current source 140 is of a fixed amplitude, further preferably the fixed amplitude is a function of the voltage across reference voltage source 130. Preferably the amplitude of switchable current source 150, when enabled, is of a fixed amplitude. In one embodiment the fixed amplitude is a function of input voltage VIN. In one embodiment the directions of current source and switchable current source 150 are reversed.

In operation, when feedback signal FB falls to less than voltage VREF, hysteretic comparator 20 closes electronically controlled switch 50, opens electronically controlled switch 60 and enables switchable current source 150. Inductor 70 is thus connected to input voltage VIN and current flow is enabled through inductor 70, defined as positive when flowing in the direction of output capacitor 80 and increasing over time thus increasing output voltage VOUT. When feedback signal FB is greater than voltage VREF, hysteretic comparator 20 opens electronically controlled switch 50, closes electronically controlled switch 60 and disables switchable current source 150. Inductor 70 is thus connected to the common potential and current flow through inductor 70 decreases over time thus decreasing output voltage VOUT. Hysteresis is provided by hysteresis comparator 20 to avoid instability. Advantageously, the division of output voltage VOUT by voltage divider 110 allows use of a low voltage comparator for hysteretic comparator 20.

Ramp generator 120 is arranged to produce a ramp voltage which is added to reference voltage source 130. Specifically, current output from current source 140, denoted I1, which as indicated above is preferably a function of the potential across reference voltage source 130, is arranged to charge ramp capacitor 180 over time, thereby causing voltage VREF to ramp up over time. When switchable current source 150 is enabled, current output from switchable current source 150, denoted I2, which as indicated above is preferably a function of input voltage VIN, is discharged from ramp capacitor 180, thereby causing voltage VREF to ramp down over time.

In further detail, when PFET 50 is closed, i.e. the current across inductor 70 is rising, switchable current source 150 is enabled. Current I2 is greater than current I1, and as a result capacitor 180 begins to discharge and voltage VREF begins to ramp down. When voltage VREF drops below feedback signal FB hysteretic comparator 20 is arranged to open PFET 50 and close PFET 60, as described above, and switchable current source 150 is disabled. In the absence of current I2 of the disabled switchable current source 150, capacitor 180 is charged by current I1, thereby voltage VREF begins to ramp up. When voltage VREF becomes greater than feedback signal FB hysteretic comparator 20 is arranged to open NFET 60 and close PFET 50, as described above, and switchable current source 150 is enabled.

The closed loop arrangement of hysteretic converter 100 causes output voltage VOUT to be, on average:

$$VOUT = \alpha * VREF \qquad \text{EQ. 1}$$

where $\alpha$ is a function of the division of output voltage VOUT by voltage divider 110, specifically:

$$\alpha = VOUT/FB \qquad \text{EQ. 2}$$

In order to properly regulate output voltage VOUT, VREF should maintain a constant average reference voltage over time. In one embodiment, current source 140 and switchable current source 150 are selected such that the average voltage across ramp capacitor 180 is zero, voltage VREF thus maintaining an average voltage equal to the voltage output by reference voltage source 130. In one particular embodiment, current source 140 and switchable current source 150 are selected such that the average of the combination of currents I1 and I2 is zero. Specifically, current source 140 and switchable current source 150 are preferably selected such that the ratio between current I2 and current I1 is:

$$I2/I1 = 1/D \qquad \text{EQ. 3}$$

where D is the duty ratio of switchable current source 150, i.e. the duty ratio of PFET 50. In the event that the average of the combination of currents I1 and I2 are not exactly zero, ramp resistor 170 is arranged to present a discharge path to ramp capacitor 180, so as to prevent excessive build up of charge across ramp capacitor 180. It is to be understood that over a range of load conditions D varies over a range of potential values, and thus EQ. 3 is not maintained.

The above has been described in relation to an embodiment wherein ramp capacitor 180 is connected between reference voltage source 130 and hysteretic comparator 20, however this is not meant to be limiting in any way. In another embodiment, ramp capacitor 180, ramp resistor 170, current source 140 and switchable current source 150 are all connected in parallel between reference voltage source 130 and the common potential without exceeding the scope.

The above has been described in relation to an embodiment wherein switched mode power supply 40 comprises a buck converter, however this is not meant to be limiting in any way and any switched mode power supply, including but not limited to a boost converter, or a buck boost converter, may be provided without exceeding the scope.

Figure 2B:
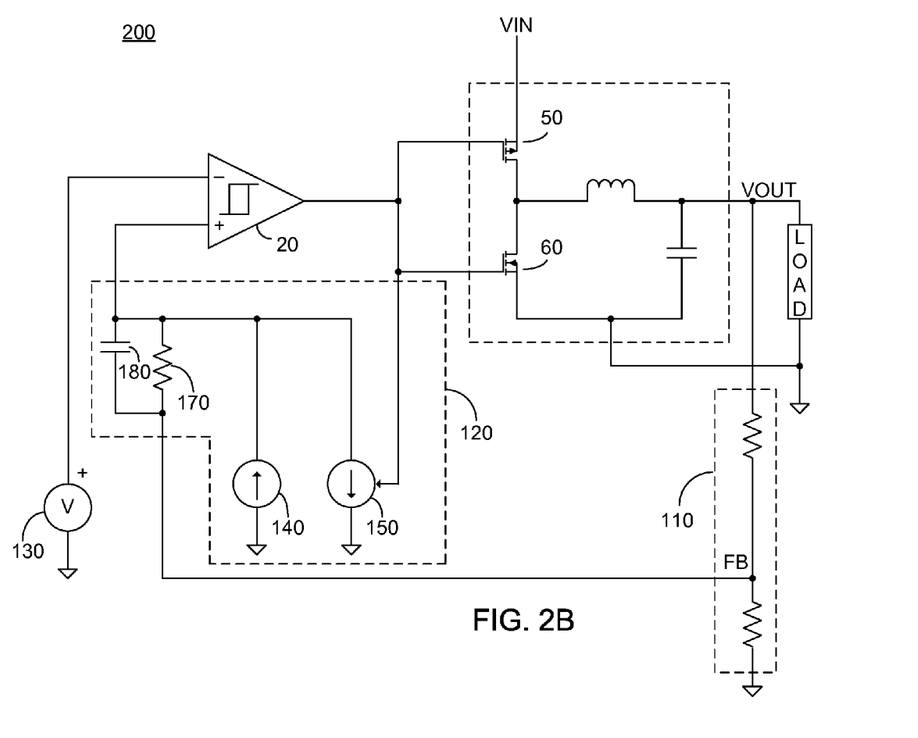
FIG. 2B illustrates a high level schematic diagram of an exemplary embodiment of a hysteretic converter comprising a pair of current sources and a ramp capacitor, one of the current sources arranged to be enabled when the top switch of a half bridge driving circuit is enabled thereby forming a ramp voltage across the ramp capacitor, the ramp voltage added to a feedback signal.

FIG. 2B illustrates a high level schematic diagram of an exemplary embodiment of a hysteretic converter 200. Hysteretic converter 200 is in all respects similar to hysteretic converter 100 of FIG. 2A with the exception that the inverting input of hysteretic comparator 20 is connected to the output of reference voltage source 130. The non-inverting input of hysteretic comparator 20 is connected to the first end of ramp capacitor 180, of ramp generator 120, the first end of ramp resistor 170, the output of current source 140 and the input of switchable current source 150. The second end of ramp capacitor 180 and the second end of ramp resistor 170 are commonly connected to the common node of voltage divider 110. Furthermore, inverter 160 is not provided and the control input of switchable current source 150 is connected to the output of hysteretic comparator 20.

The operation of hysteretic converter 200 is in all respects similar to the operation of hysteretic converter 100 with the exception that the ramp voltage produced across ramp capacitor 180 is added to feedback signal FB at the common node of voltage divider 110 instead of to the output of reference voltage source 130. Since the ramp voltage is added to feedback signal FB the voltage across ramp capacitor 180 is arranged to ramp up when PFET 50 is closed and ramp down when PFET 50 is open. However, as indicated above, over a range of load conditions, EQ. 3 is not maintained, and thus the voltage across ramp capacitor 180 may not average zero over time, resulting in a variance of VOUT from the desired value described by EQ. 1 and EQ. 2.

Figure 2C:
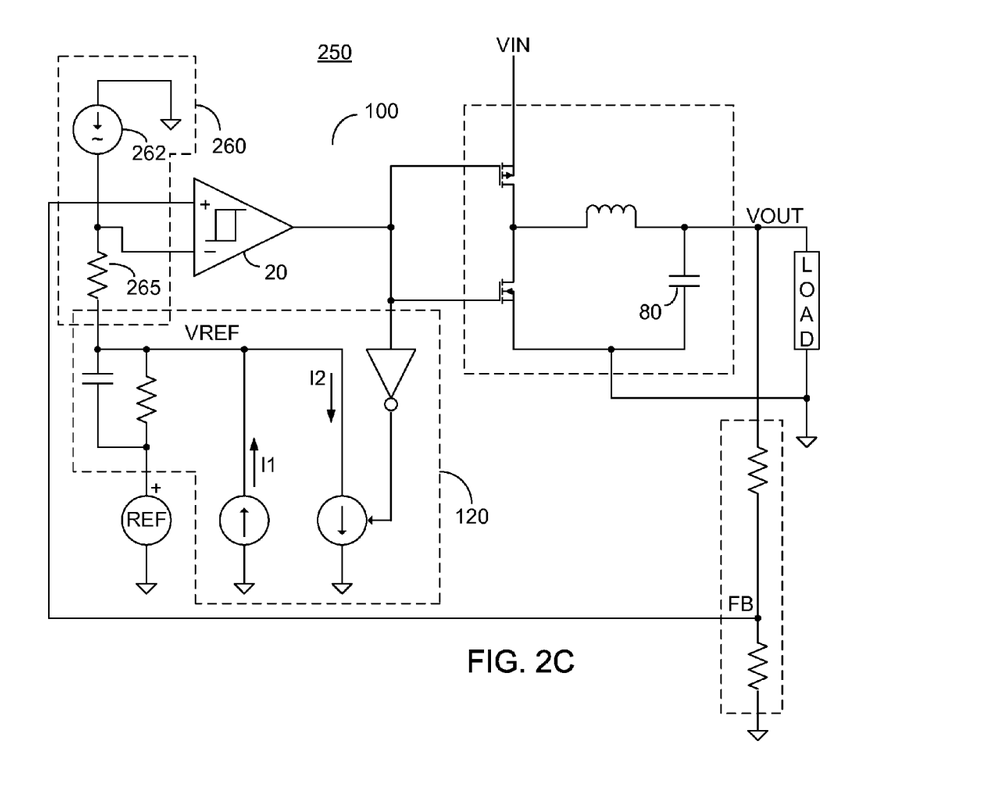
FIG. 2C illustrates a high level schematic diagram of an exemplary embodiment of the hysteretic converter of FIG. 2A, further comprising a synchronization circuit coupled to an input of the hysteretic comparator.

FIG. 2C illustrates a high level schematic diagram of an exemplary embodiment of a hysteretic converter 250, comprising hysteretic converter 100 of FIG. 2A, and further comprising a synchronization circuit 260 coupled to an input of hysteretic comparator 20. Synchronization circuit 260 comprises a periodic current source 262, and a resistor 265. A first end of periodic current source 262 is connected to the inverting input of comparator 20 and via resistor 265 to voltage VREF. Periodic current source 262 is arranged to drive a periodic current towards the inverting input of comparator 20. A second end of periodic current source 262 is connected to the common potential. Preferably periodic current source 262 a signal with a low duty cycle, such as a 1% duty cycle, without limitation, with the signal being active low.

In operation, hysteretic converter 250 is in all respects identical to hysteretic converter 100, with synchronization to the output of periodic current source 262. In particular, when periodic current source 262 is active, the output of comparator 20 is forced to be positive. During the period when periodic current source 262 is not active, the output of comparator 20 is as described above in relation to FIG. 2A. Thus, the cycling of comparator 20 is synchronized over time to the active period of periodic current source 262, and as a result hysteretic comparator 280 is thus synchronized responsive to synchronization circuit 260.

Figure 2D:
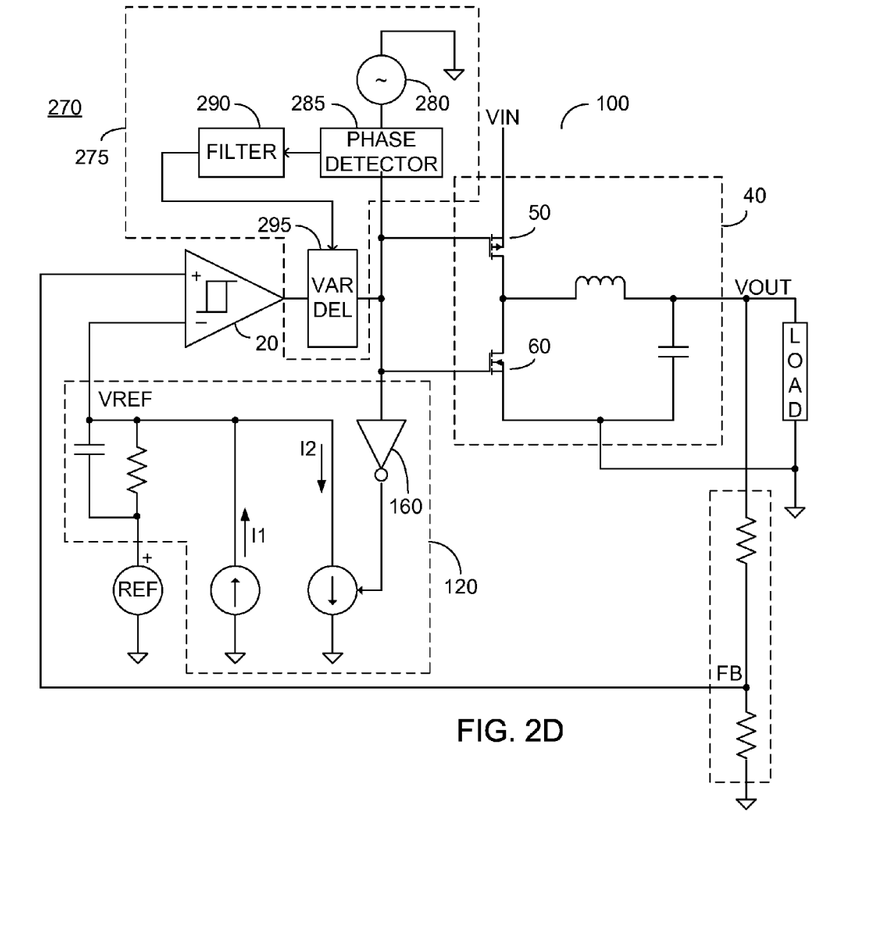
FIG. 2D illustrates a high level schematic diagram of an exemplary embodiment of the hysteretic converter of FIG. 2A, further comprising a synchronization circuit comprising a variable delay element coupled to the output of the hysteretic comparator.

FIG. 2D illustrates a high level schematic diagram of an exemplary embodiment of a hysteretic converter 270, comprising hysteretic converter 100 of FIG. 2A, and further comprising synchronization circuit 275. Synchronization circuit 275 comprises: a periodic signal generator 280; a phase detector 285; a filter 290 and a variable delay element 295. Periodic signal generator 280 is connected between one input of phase detector 285 and the common potential. The output hysteretic comparator is connected to the input of variable delay element 295, and the output of variable delay element 295 is connected to a second input of phase detector 285 and to the gates of electronically controlled switches 50, 60 and the input of inverter 160. The output of phase detector 285 is connected via filter 290 to the control input of variable delay element 295. Ramp generator 120 is illustrated without resistor 170, as in certain embodiments resistor 170 is not required.

In operation, hysteretic converter 270 is in all respects identical to hysteretic converter 100, with synchronization responsive to synchronization circuit 275. The phase of periodic signal generator 280 is compared to the phase of the drive input to electronically controlled switches 50, 60, and a delay is increased to variable delay element 295, or decreased to variable delay element 295 responsive to the phase delay. Filter 290 functions to reduce noise. Thus the drive signal to electronically controlled switches 50, 60, is synchronized to the output of periodic signal generator 280.

Figure 2E:
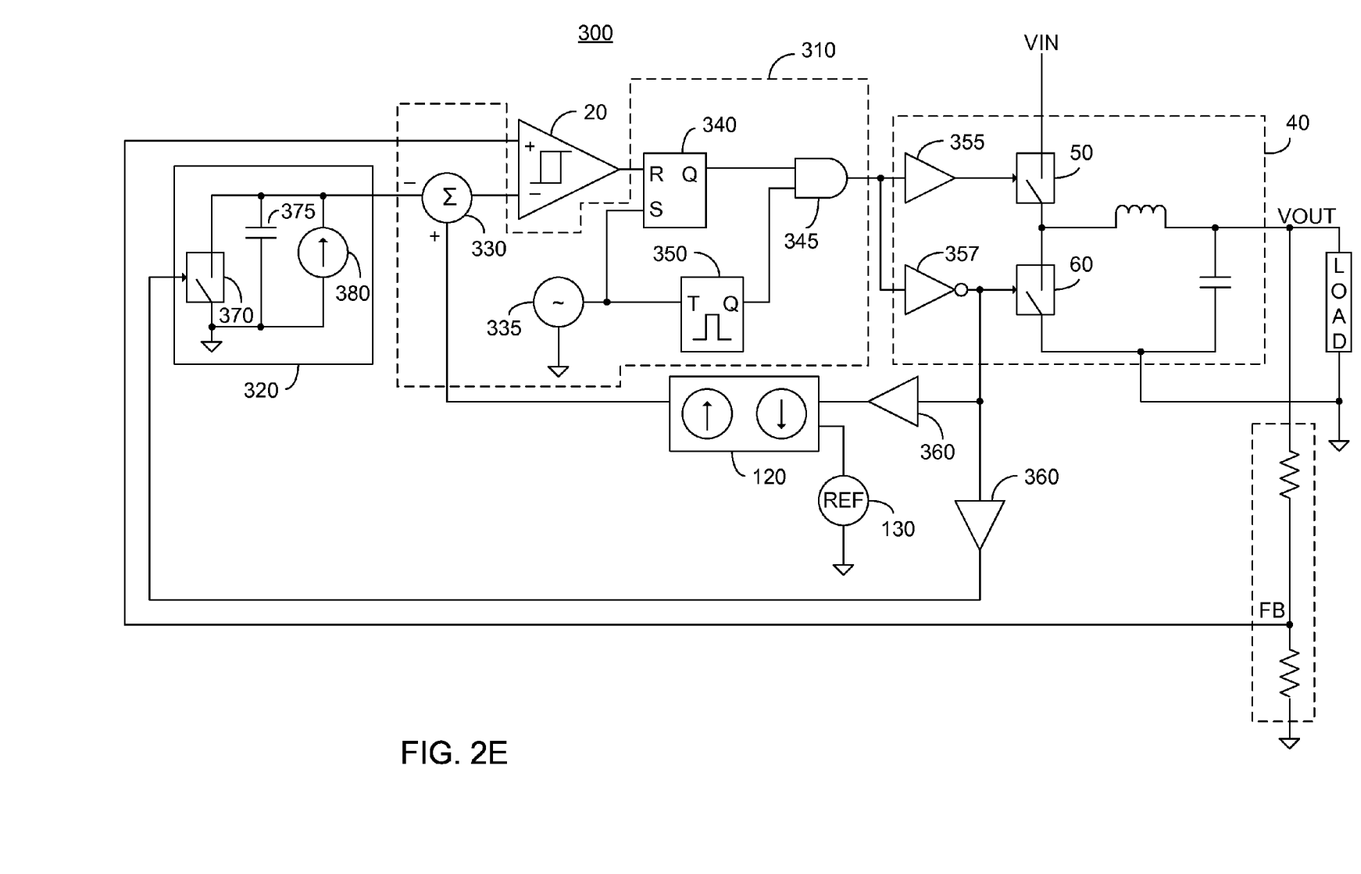
FIG. 2E illustrates a high level schematic diagram of an exemplary embodiment of the hysteretic converter of FIG. 2A, further comprising a synchronization circuit, and an optional slope compensation circuit.

FIG. 2E illustrates a high level schematic diagram of an exemplary embodiment of a hysteretic converter 300, comprising a hysteretic converter, as described above in relation to hysteretic converter 100 of FIG. 2A, and further comprising a synchronization circuit 310, and an optional slope compensation circuit 320. Switched mode power supply 40 is shown constituted of a first electronically controlled switch 50 and a second electronically controlled switch 60, for generality. First electronically controlled switch 50 is shown driven by a buffer 355, and second electronically controlled switch 60 is shown driven by an inverting buffer 370. A delay circuit, such as an additional buffer, may be provided to prevent shoot through. The balance of switched mode power supply 40 is in all respects identical to switched mode power supply 40 of FIG. 2A and thus in the interest of brevity will not be further described.

A plurality of buffers 360 are provided. Optional slope compensation circuit 320 comprises an electronically controlled switch 370, a capacitor 375 and a current source 380. Synchronization circuit 320 comprises: a summing amplifier 330; a periodic signal source 335; an RS flip-flop 340; an AND gate 345; and a optional monostable multivibrator 350, also known as a "one shot". Periodic signal source 335 is shown as being within synchronization circuit 320, however this is not meant to be limiting in any way, and the use an external periodic signal source is particularly envisioned.

The output of inverting buffer 357 is connected via a first respective buffer 360 to the control input of electronically controlled switch 370 and via a second respective buffer 360 to the control input of ramp generator 120. Ramp generator 120 receives the output of reference voltage source 130, as described above, and the output of ramp generator 120 is connected to a non-inverting input of the summing amplifier 330.

A first end of electronically controlled switch 370 is connected to a first end of capacitor 375, the positive output of current source 380 and the inverting input of summing amplifier 330. The second end of each of electronically controlled switch 370, capacitor 375 and current source 380 are commonly connected to the common potential. The output of summing amplifier 330 is connected to the inverting input of hysteretic comparator 20.

The output of hysteretic comparator 20 is connected to the Reset input of SR flip-flop 340 and the Q output of SR flip-flop 340 is connected to a first input of AND gate 345. The output of periodic signal source 335 is connected to the trigger input of optional monostable multivibrator 350, and the output of optional monostable multivibrator 350 is connected to a second input of AND gate 345. The output of AND gate 345 is connected to the inputs of each of buffer 355 and inverting buffer 357, and the return of periodic signal source 335 is connected to the common potential.

In operation, switched mode power supply 40 in cooperation with hysteretic comparator 20 and ramp generator 120 operate as described above in relation to hysteretic converter 100 of FIG. 2A. Additionally, the operation of switched mode power supply 40 is synchronized with output of periodic signal source 335 responsive to synchronization circuit 310. Optional slope compensation circuit 320 operates to reduce sub-harmonic oscillation when the duty cycle of switched mode power supply 40 is greater than 50%.

The operation of synchronization circuit 310 will now be further described. When the voltage of feedback signal FB, which represents VOUT, becomes greater than the output of reference voltage source 130, neglecting any perturbations caused by ramp generator 120 and optional slope compensation circuit 320, SR flip-flop 340 is reset, thus setting the output of AND gate 345 to a low logic level, and thus first electronically controlled switch 50 is opened responsive to buffer 355 and second electronically controlled switch 60 is closed responsive to inverting buffer 357.

SR flip-flop 340 is set responsive to periodic signal source 335, and thus responsive to predetermined condition of periodic signal source 335, such as a rising edge, first electronically controlled switch 50 is closed, responsive to AND gate 345 and buffer 355 and second electronically controlled switch 60 is opened responsive to inverting buffer 357. Thus, first electronically controlled switch 50, the high side switch is closed periodically responsive to the output of periodic signal source 335, and second electronically controlled switch 60, the low side switch, is contemporaneously opened. First electronically controlled switch 50 is opened responsive to the output of hysteretic comparator 20, and thus amount of time which first electronically controlled switch 50 is closed is determined responsive to hysteretic comparator 20. Thus, the switching operation of switched mode power supply 40 is synchronized with the output of periodic signal source 335. Such a synchronization advantageously provides reduced jitter as compared with the PLL synchronization described above in relation to FIG. 2D.

Optional monostable multivibrator 350, operates to provide a fixed maximum period for the closed state of first electronically controlled switch 50, since after the end of the predetermined period of optional monostable multivibrator 350 the output of AND gate 345 becomes low, thus forcing first electronically controlled switch 50 open.

As described above, ramp generator 120 functions to add a small ramp voltage to the output of reference voltage source 130 thus adding to stability. Ramp generator 120 may comprise auto-zero circuit 410, as described below, without exceeding the scope.

The operation of optional slope compensation circuit 320 will now be further described. When second electronically controlled switch 60, i.e. the low side switch, is closed, electronically controlled switch 370 is similarly closed, thus shorting out capacitor 375, and setting the inverting input of summing amplifier 330 to the common potential, i.e. to zero. When second electronically controlled switch 60 is opened, electronically controlled switch 370 similarly opens, and capacitor 375 begins to charge responsive to current source 380. The rising voltage across capacitor 375 is deducted from the output of ramp generator 120 and the sum is presented to the inverting input of hysteretic comparator 20. Hysteretic Comparator 20 switches responsive to the inflection of ramp generator 120, and slope compensation circuit 320 provides stability for duty cycles in excess of 50%.

Figure 2F:
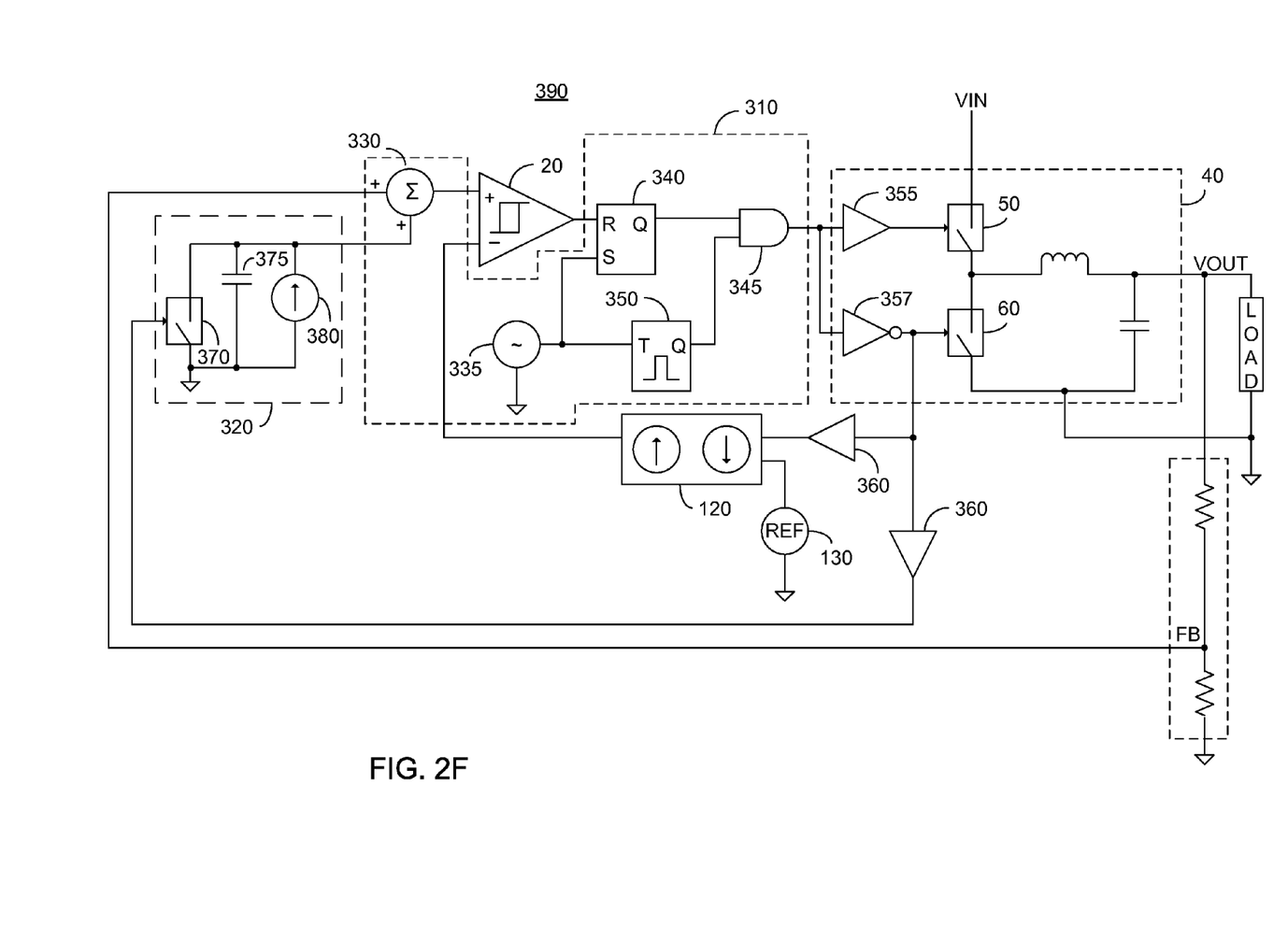
FIG. 2F illustrates a high level schematic diagram of an exemplary embodiment of the hysteretic converter of FIG. 2E, wherein the output of the slope compensation circuit is summed with the feedback signal voltage.

FIG. 2F illustrates a high level schematic diagram of an exemplary embodiment of hysteretic converter 390, which is in all respects identical with hysteretic converter 300 of FIG. 2E, with the exception that the output of slope compensation circuit 320 is added wherein the output of the slope compensation circuit is summed with feedback signal FB via summing amplifier 330. Feedback signal FB and the output of slope compensation circuit 320 are each coupled to respective non-inverting inputs of summing amplifier 330, and the output of summing amplifier 330 is coupled to the non-inverting input of hysteretic comparator 20. The output of ramp generator 120 is coupled to the inverting input of hysteretic comparator 20. The operation of hysteretic converter 390 is in all respects identical to the operation of hysteretic converter 300 and in the interest of brevity will not be further detailed.

Figure 3:
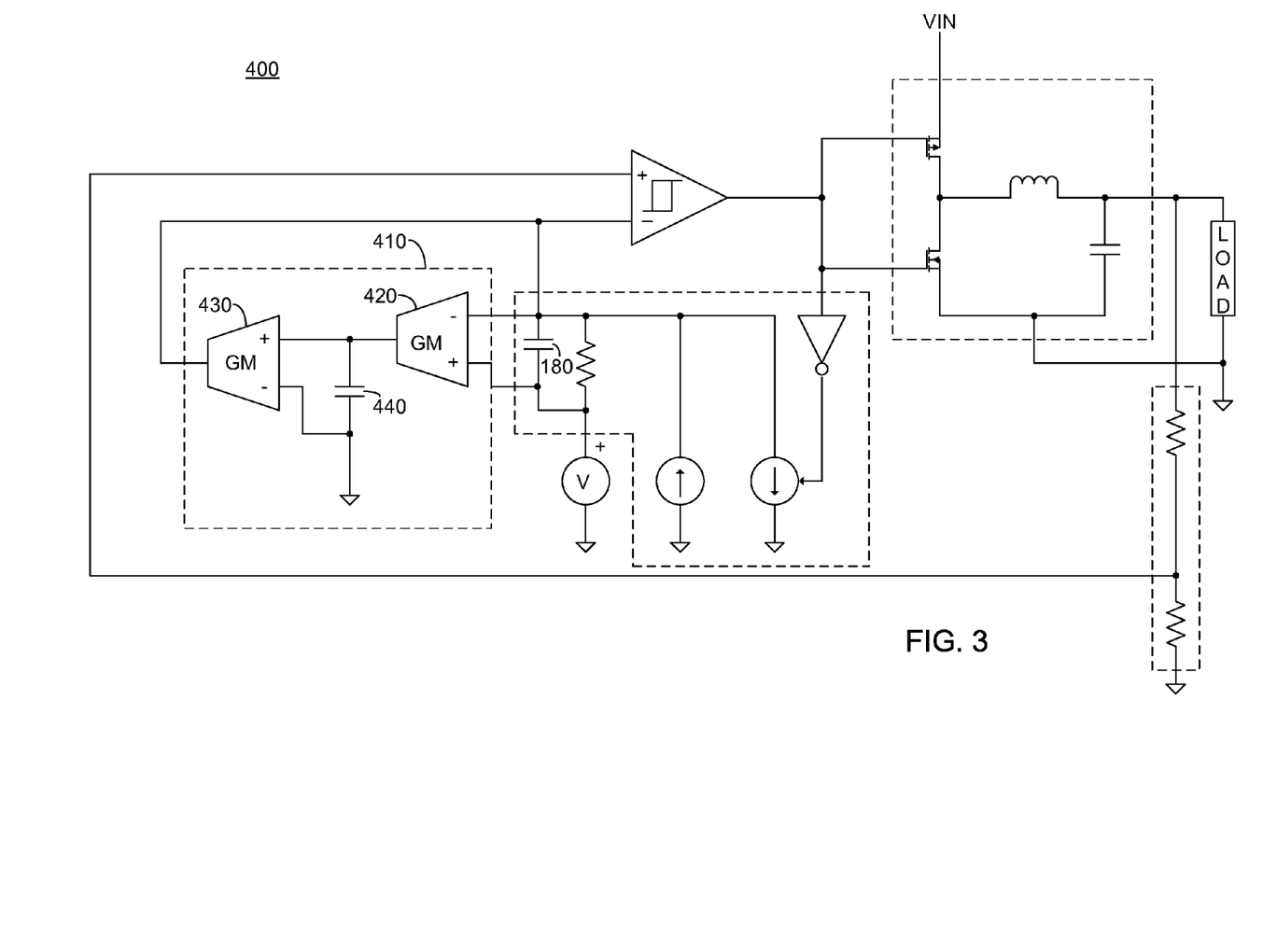
FIG. 3 illustrates a high level schematic diagram of an exemplary embodiment of a hysteretic converter comprising a pair of current sources, one of the current sources arranged to be enabled when the top switch of a half bridge driving circuit is enabled, and further comprising an auto-zero circuit.

FIG. 3 illustrates a high level schematic diagram of an exemplary embodiment of a hysteretic converter 400. Hysteretic converter 400 is in all respects similar to hysteretic converter 100 of FIG. 2A with the exception that hysteretic converter 400 further comprises an auto-zero circuit 410. Auto-zero circuit 410 comprises: a first transconductance amplifier 420; a second transconductance amplifier 430; and an averaging capacitor 440. The inverting input of first transconductance amplifier 420 is connected to the first end of ramp capacitor 180 and the non-inverting input of first transconductance amplifier 420 is connected to the second end of ramp capacitor 180. The output of first transconductance amplifier 420 is connected to the non-inverting input of second transconductance amplifier 430 and a first end of averaging capacitor 440. A second end of averaging capacitor 440 and the inverting input of second transconductance amplifier 430 are each connected to the common potential. The output of second transconductance amplifier 430 is connected to the first end of ramp capacitor 180.

The operation of hysteretic converter 400 is in all respects similar to the operation of hysteretic converter 100, with the exception that when the voltage across ramp capacitor 180 is less than zero, averaging capacitor 440 is charged by first transconductance amplifier 420 and when the voltage across ramp capacitor 180 is greater than zero, averaging capacitor 440 is discharged by first transconductance amplifier 420, thus ensuring that the average voltage across ramp capacitor 180 is zero. Preferably, first transconductance amplifier 420 and averaging capacitor 440 are selected such that averaging capacitor 440 charges at a slower rate than ramp capacitor 180. The bandwidth of this averaging circuit is typically significantly slower than the crossover frequency of hysteretic converter 400. Thus, the voltage across averaging capacitor 440 represents the inversed value of the average voltage across ramp capacitor 180. If the voltage across averaging capacitor 440 is less than zero, i.e. the average voltage across ramp capacitor 180 is greater than zero, second transconductance amplifier 430 is arranged to discharge ramp capacitor 180. If the voltage across averaging capacitor 440 is greater than zero, i.e. the average voltage across ramp capacitor 180 is less than zero, second transconductance amplifier 430 is arranged to charge ramp capacitor 180. Thus, auto-zero circuit 410 is arranged to actively set the average voltage across ramp capacitor 180 to zero. In such an embodiment ramp resistor 170 is not required. The use of ramp resistor 170 however may be advantageous in certain embodiments to put a bound on auto-zero circuit 410 and/or improve transient response performance.

Figure 4:
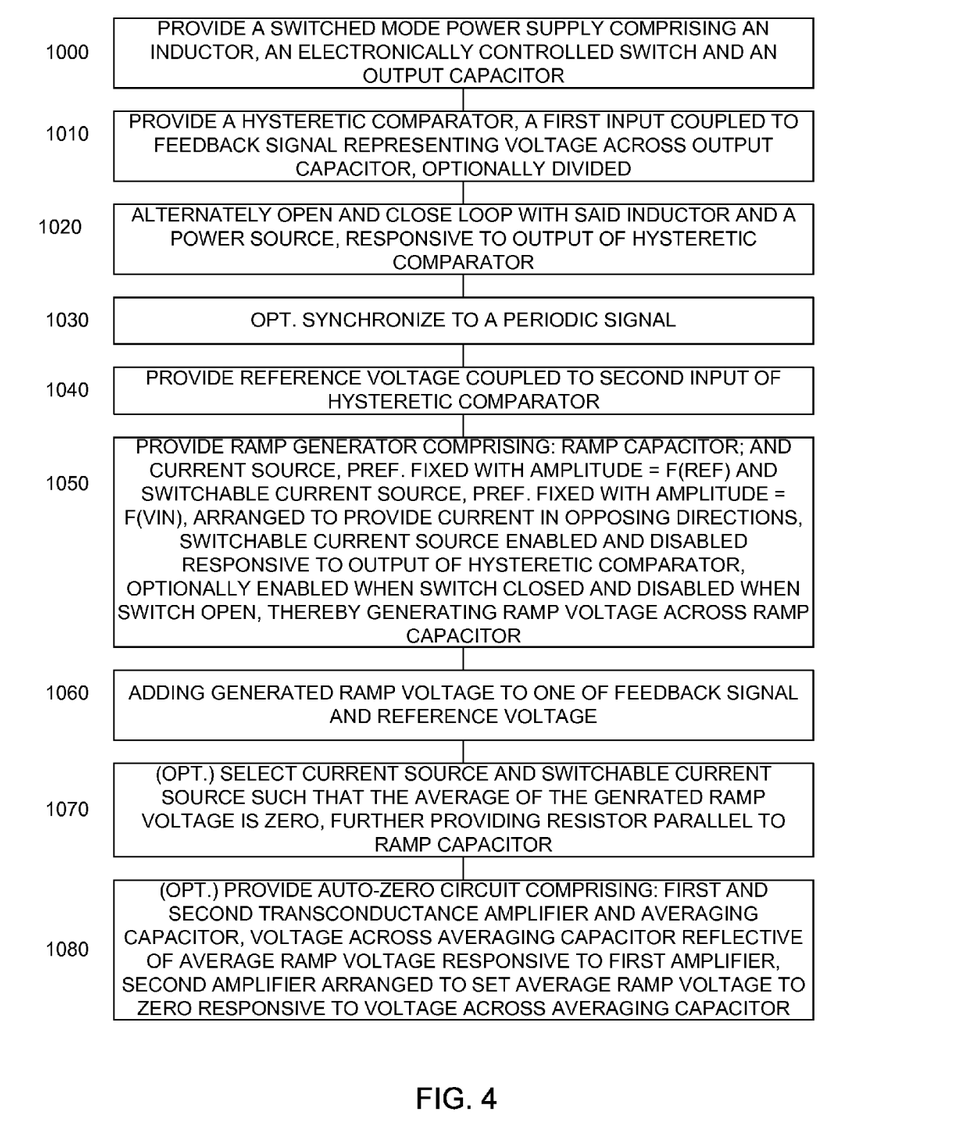
FIG. 4 illustrates a high level flow of an exemplary embodiment of a method of hysteretic power conversion.

FIG. 4 illustrates a high level flow chart of a method of hysteretic power conversion according to certain embodiments. In stage 1000, a switched mode power supply is provided, such as switched mode power supply 40. As described above in relation to FIG. 2A, any type of switched mode power supply may be provided, without limitation. The switched mode power supply comprises an inductor, an electronically controlled switch and an output capacitor. In stage 1010, a hysteretic comparator is provided. A first input of the provided hysteretic comparator is coupled to a feedback connection arranged to provide a feedback signal representative of the voltage across the output capacitor. In one embodiment, the voltage across the output capacitor is divided by a voltage divider, a divided portion of the voltage constituting the feedback signal. In stage 1020, a loop is alternately opened and closed with the inductor and a power source, responsive to the output of the provided hysteretic comparator of stage 1010. In one embodiment, the loop is opened and closed by respectively opening and closing the electronically controlled switch. In optional stage 1030 the opening and closing of the loop is synchronized to a periodic signal.

In stage 1040, a reference voltage is provided, the provided reference voltage coupled to the second input of the provided hysteretic comparator of stage 1010. In stage 1050, a ramp generator is provided, the ramp generator comprising: a ramp capacitor; a current source, preferably of a fixed value which is a function of the provided reference voltage of stage 1040; and a switchable current source, preferably of a fixed value, which when enabled is a function of the input voltage. The ramp capacitor, current source and switchable current source are connected to a common node and the switchable current source is arranged to provide a current flow in a direction opposing the direction of the current flow provided by the current source in relation to the common node. The ramp capacitor is charged and discharged by the provided currents, thereby generating a ramp voltage across the ramp capacitor as described above. The switchable current source is alternately enabled and disabled responsive to the output of the provided hysteretic comparator of stage 1010. In one embodiment, the switchable current source is enabled when the electronically controlled switch of stage 1000 is closed and disabled when the electronically controlled switch is open.

In stage 1060, the generated ramp voltage of stage 1050 is added to one of the feedback signal and the reference voltage. In one particular embodiment, the generated ramp voltage is added to the reference voltage. In one further embodiment, the ramp capacitor of stage 1050 is coupled between the provided reference voltage of stage 1040 and the second input of the provided hysteretic comparator of stage 1010. In optional stage 1070, the current source and the switchable current source of stage 1050 are selected such that the average ramp voltage produced across the ramp capacitor is zero. In one embodiment a ramp resistor is provided, connected in parallel to the ramp capacitor and arranged to provide a discharge path to the ramp capacitor to provide a discharge path for any accumulated charge there across.

In optional stage 1080, an auto-zero circuit is provided, the auto-zero circuit preferably comprising: a first and a second transconductance amplifier; and an averaging capacitor. The voltage across the averaging capacitor is reflective of the average ramp voltage across the ramp capacitor of stage 1050, responsive to the output of the first transconductance amplifier. In one embodiment the inputs of the first transconductance amplifier are coupled across the ramp capacitor and the output of the first transconductance amplifier is coupled to the averaging capacitor. The second transconductance amplifier is preferably arranged to actively set the average ramp voltage to zero responsive to the voltage across the averaging capacitor. In one embodiment, the inputs of the second transconductance amplifier are coupled across the averaging capacitor and the output of the second transconductance amplifier is connected to the ramp capacitor.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

The invention claimed is:

1. A hysteretic power converter comprising:
a switched mode power supply comprising an inductor, an electronically controlled switch and an output capacitor, said electronically controlled switch arranged to alternately open and close a loop with said inductor and leads of a power source;
a synchronization circuit arranged to synchronize said switched mode power supply with a periodic signal, said synchronization circuit arranged to close said electronically controlled switch responsive to each and every occurrence of a predetermined condition of the periodic signal;
a hysteretic comparator, a first input of said hysteretic comparator coupled to a feedback connection and arranged to receive from the feedback connection a feedback signal providing a representation of the voltage across said output capacitor, said electronically controlled switch opened responsive to the output of said hysteretic comparator;
a reference voltage source coupled to a second input of said hysteretic comparator and arranged to provide a reference voltage;
a ramp capacitor coupled to one of said reference voltage source and said feedback connection;
a current source, a terminal of said current source coupled to said ramp capacitor and arranged to drive current to said ramp capacitor;
a switchable current source, a terminal of said switchable current source coupled to said ramp capacitor, said switchable current source arranged to drive current to said ramp capacitor in a direction opposite the current driven by said current source, wherein said switchable current source is alternately enabled and disabled responsive to the output of said hysteretic comparator; and
an auto-zero circuit coupled across said ramp capacitor and arranged to set the average voltage across said ramp capacitor to zero.

2. The hysteretic power converter according to claim 1, wherein said switchable current source is arranged to provide a current, when enabled, whose amplitude is a function of the voltage of the leads of the power source.

3. The hysteretic power converter according to claim 1, wherein said current source is arranged to provide a current whose amplitude is a function of the reference voltage source.

4. The hysteretic power converter according to claim 1, further comprising a voltage divider, an end of said voltage divider coupled to said output capacitor, the feedback connection being a connection to the common node of said voltage divider.

5. The hysteretic power converter according to claim 1, wherein said switchable current source is enabled when said electronically controlled switch is closed, and disabled when said first electronically controlled switch is open.

6. The hysteretic power converter according to claim 1, wherein said current source and said switchable current source are selected such that the average voltage across said ramp capacitor is zero.

7. The hysteretic power converter according to claim 6, further comprising a ramp resistor coupled in parallel with said ramp capacitor.

8. A hysteretic power converter comprising:
a switched mode power supply comprising an inductor, an electronically controlled switch and an output capacitor, said electronically controlled switch arranged to alternately open and close a loop with said inductor and leads of a power source;
a hysteretic comparator, a first input of said hysteretic comparator coupled to a feedback connection and arranged to receive from the feedback connection a feedback signal providing a representation of the voltage across said output capacitor, said electronically controlled switch opened and closed responsive to the output of said hysteretic comparator;
a reference voltage source coupled to a second input of said hysteretic comparator and arranged to provide a reference voltage;

a ramp capacitor coupled to one of said reference voltage source and said feedback connection;
a current source, a terminal of said current source coupled to said ramp capacitor and arranged to drive current to said ramp capacitor;
a switchable current source, a terminal of said switchable current source coupled to said ramp capacitor, said switchable current source arranged to drive current to said ramp capacitor in a direction opposite the current driven by said current source, wherein said switchable current source is alternately enabled and disabled responsive to the output of said hysteretic comparator; and
an auto-zero circuit coupled across said ramp capacitor and arranged to set the average voltage across said ramp capacitor to zero,
wherein said auto-zero circuit comprises:
a first transconductance amplifier;
a second transconductance amplifier; and
an averaging capacitor,
a first input of said first transconductance amplifier coupled to a first end of said ramp capacitor and a second input of said first transconductance amplifier coupled to a second end of said ramp capacitor, the output of said first transconductance amplifier coupled to a first input of said second transconductance amplifier, said averaging capacitor coupled between the first input of said second transconductance amplifier and a second input of said second transconductance amplifier and arranged to reflect the average of the voltage across said ramp capacitor, the output of said second transconductance amplifier coupled to the first end of said ramp capacitor,
wherein in the event that the average voltage across said ramp capacitor increases, said second transconductance amplifier outputs a current so as to decrease the voltage across said ramp capacitor and in the event that the average voltage across said ramp capacitor decreases, said second transconductance amplifier outputs a current so as to increase the voltage across said ramp capacitor.

9. The hysteretic power converter according to claim 8, further comprising a synchronization circuit arranged to synchronize said switched mode power supply with a periodic signal.

10. The hysteretic power converter according to claim 1, wherein said synchronization circuit is further arranged to open said electronically controlled switch after expiration of a fixed maximum period.

11. The hysteretic power converter according to claim 1, further comprising a slope compensation circuit.

12. A hysteretic power converter comprising:
a switched mode power supply comprising an inductor, an electronically controlled switch and an output capacitor, said electronically controlled switch arranged to alternately open and close a loop with said inductor and a power source;
a synchronization circuit arranged to synchronize said switched mode power supply with a periodic signal, said synchronization circuit arranged to close said electronically controlled switch responsive to each and every occurrence of a predetermined condition of the periodic signal;
a hysteretic comparator, a first input of said hysteretic comparator coupled to a feedback connection and arranged to receive from said feedback connection a feedback signal providing a representation of the voltage across said output capacitor, said electronically controlled switch opened responsive to the output of said hysteretic comparator;
a reference voltage source coupled to a second input of said hysteretic comparator and arranged to produce a reference voltage;
a ramp generator arranged to generate a ramp voltage added to one of said reference voltage and the feedback signal, said ramp generator comprising:
a current source, a switchable current source and a ramp capacitor, a terminal of each of said current source and said switchable current source coupled to said ramp capacitor, said current source and said switchable current source arranged to drive current to said ramp capacitor in opposing directions,
wherein said switchable current source is alternately enabled and disabled responsive to the output of said hysteretic comparator, and
an auto-zero circuit coupled across said ramp capacitor and arranged to set the average of said generated ramp voltage to zero.

13. The hysteretic power converter according to claim 12, wherein said current source is arranged to provide a current whose amplitude is a function of said reference voltage source, and said switchable current source is arranged to provide a current, when enabled, whose amplitude is a function of the voltage of the leads of the power source.

14. The hysteretic power converter according to claim 12, further comprising a voltage divider, an end of said voltage divider coupled to said output capacitor, wherein the feedback connection is a connection to the common node of said voltage divider.

15. The hysteretic power converter according to claim 12, wherein said switchable current source is enabled when said electronically controlled switch is closed, and disabled when said electronically controlled switch is open.

16. The hysteretic power converter according to claim 12, wherein said current source and said switchable current source are selected such that the average of said generated ramp voltage is zero.

17. The hysteretic power converter according to claim 16, wherein said ramp generator further comprises a ramp resistor coupled in parallel with said ramp capacitor.

18. A hysteretic power converter comprising:
a switched mode power supply comprising an inductor, an electronically controlled switch and an output capacitor, said electronically controlled switch arranged to alternately open and close a loop with said inductor and a power source;
a hysteretic comparator, a first input of said hysteretic comparator coupled to a feedback connection and arranged to receive from said feedback connection a feedback signal providing a representation of the voltage across said output capacitor, said electronically controlled switch opened and closed responsive to the output of said hysteretic comparator;
a reference voltage source coupled to a second input of said hysteretic comparator and arranged to produce a reference voltage;
a ramp generator arranged to generate a ramp voltage added to one of said reference voltage and the feedback signal, said ramp generator comprising:
a current source, a switchable current source and a ramp capacitor, a terminal of each of said current source and said switchable current source coupled to said ramp capacitor, said current source and said switchable current source arranged to drive current to said ramp capacitor in opposing directions, wherein said switchable current source is alternately enabled and disabled responsive to the output of said hysteretic comparator, and an auto-zero circuit coupled across said ramp capacitor and arranged to set the average of said generated ramp voltage to zero, wherein said auto-zero circuit comprises:
- a first transconductance amplifier;
- a second transconductance amplifier; and
- an averaging capacitor,
    - a first input of said first transconductance amplifier coupled to a first end of said ramp capacitor and a second input of said first transconductance amplifier coupled to a second end of said ramp capacitor, the output of said first transconductance amplifier coupled to a first input of said second transconductance amplifier, said averaging capacitor coupled between the first input of said second transconductance amplifier and a second input of said second transconductance amplifier and arranged to reflect the average of the voltage across said ramp capacitor, the output of said second transconductance amplifier coupled to the first end of said ramp capacitor,
    - wherein in the event that the average of said generated ramp voltage increases, said second transconductance amplifier outputs a current so as to decrease said generated ramp voltage and in the event that the average of said generated ramp voltage decreases, said second transconductance amplifier outputs a current so as to increase said generated ramp voltage.

19. The hysteretic power converter according to claim 18, further comprising a synchronization circuit arranged to synchronize said switched mode power supply with a periodic signal.

20. The hysteretic power converter according to claim 12, wherein said synchronization circuit is further arranged to open said electronically controlled switch after expiration of a fixed maximum period.

21. The hysteretic power converter according to claim 12, further comprising a slope compensation circuit.

22. A method of hysteretic power conversion comprising:
- providing a switched mode power supply constituted of an inductor and an output capacitor;
- providing a hysteretic comparator;
- providing to a first terminal of said provided hysteretic comparator a feedback signal representative of the voltage across said output capacitor;
- responsive to the output of said hysteretic comparator, alternately opening and closing a loop with said inductor and a power supply;
- providing a reference voltage;
- providing a current source;
- providing a switchable current source;
- generating a ramp voltage responsive to said provided current source and said provided switchable current source coupled to a common node, wherein said switchable current source is alternately enabled and disabled responsive to the output of said hysteretic comparator;
- adding said generated ramp voltage to one of said provided reference voltage and said provided feedback signal;
- providing a first transconductance amplifier arranged to receive said generated ramp voltage;
- providing an averaging capacitor arranged to receive the output of said provided first transconductance amplifier, wherein the voltage across said provided averaging capacitor reflects the average of said generated ramp voltage;
- providing a second transconductance amplifier arranged to receive the voltage across said provided averaging capacitor; and
- actively setting the average of said generated ramp voltage to zero responsive to the output of said provided second transconductance amplifier.

23. The method according to claim 22, wherein said switchable current source is enabled when said first electronically controlled switch is closed, and disabled when said first electronically controlled switch is opened.

24. A method of hysteretic power conversion comprising:
- providing a switched mode power supply constituted of an inductor and an output capacitor;
- closing, responsive to each and every occurrence of a predetermined condition of a received periodic signal, a loop with said inductor and a power supply thereby synchronizing said provided switched mode power supply to the received periodic signal;
- providing a hysteretic comparator;
- providing to a first terminal of said provided hysteretic comparator a feedback signal representative of the voltage across said output capacitor;
- responsive to the output of said hysteretic comparator, opening the loop with said inductor and the power supply;
- providing a reference voltage;
- providing a current source;
- providing a switchable current source;
- generating a ramp voltage responsive to said provided current source and said provided switchable current source coupled to a common node, wherein said switchable current source is alternately enabled and disabled responsive to the output of said hysteretic comparator; and
- adding said generated ramp voltage to one of said provided reference voltage and said provided feedback signal.

* * * * *